United States Patent [19]

Nozawa

[11] 3,810,240

[45] May 7, 1974

[54] TAPE RECORDER

[75] Inventor: Yoshikuni Nozawa, Nagano, Japan

[73] Assignee: Sankyo Kogaku Kogyo Kabushiki Kaisha, Nagano, Japan

[22] Filed: Dec. 29, 1970

[21] Appl. No.: 102,527

Related U.S. Application Data

[62] Division of Ser. No. 867,234, Oct. 17, 1969.

[52] U.S. Cl. .......................................... 360/96

[51] Int. Cl. .......................................... G11b 15/26

[58] Field of Search ............ 274/4 C, 4 E, 4 F, 4 D, 274/11 C, 11 D; 226/49, 50; 242/199, 200; 179/100.2 Z

[56] References Cited

UNITED STATES PATENTS

| | | | |
|---|---|---|---|
| 3,646,611 | 2/1972 | Ikeda | 274/4 F |
| 3,533,633 | 10/1970 | Wilder | 274/4 D |
| 3,494,572 | 2/1970 | Uemura | 274/4 E |
| 3,604,714 | 9/1971 | Staar | 274/4 E |
| 3,589,733 | 6/1971 | Piotrowski | 274/4 F |
| 3,606,346 | 9/1971 | Okabe | 274/4 F |
| 3,512,786 | 5/1970 | Ban | 274/4 F |
| 3,070,321 | 12/1962 | Bara | 226/50 |
| 3,490,666 | 1/1970 | Takashino | 226/50 |

*Primary Examiner*—Harry N. Haroian
*Attorney, Agent, or Firm*—Waters, Roditi, Schwartz & Nissen

[57] ABSTRACT

A tape cassette loading tape recorder in which a multi-track magnetic tape provided with a plurality of tape tracks may undergo an automatic change in the direction of tape travel and head channels may be switched over from one to the other according to the directional change of tape travel. The tape recorder includes a pair of capstan shafts adapted to alternately drive the tape in opposite directions of tape travel, and a movable base plate having thereon a rockable operating lever to bring alternately any one of pinch rollers into engagement with its associated capstan shaft, a magnetic head provided with head channels, a head channel selecting switch means, and a tape-end detecting switch means. The movable base plate, upon loading of the cassette on the tape recorder, moves forwardly towards the cassette thereby making tape-to-head engagement to make the tape recorder for recording and play-back operation. On the contrary, the movable base plate, upon completion of recording or play-back for all tape tracks, moves away from the tape cassette which is in turn released from a co-operating relation with the tape recorder. The tape recorder is further provided with a cassette loading means which is manually or automatically movable from a non-operative position to an operative position or vice versa. In addition, there are provided in the tape recorder a cam mechanism to control the operational sequence of the tape recorder elements as described above, and another cam mechanism to control the movement of the cassette loading means, both cam mechanisms being electrically actuated by loading of the tape cassette to the tape recorder.

2 Claims, 25 Drawing Figures

FIG. 6
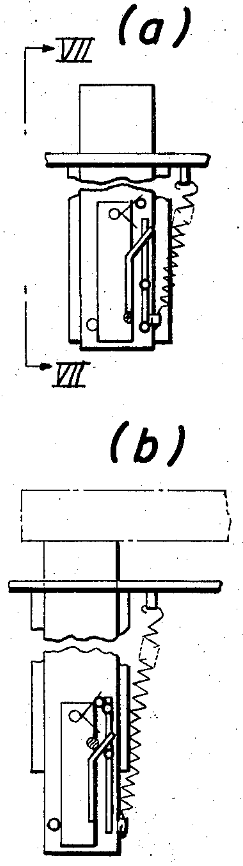
FIG. 7
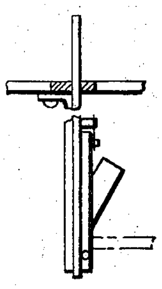
FIG. 10
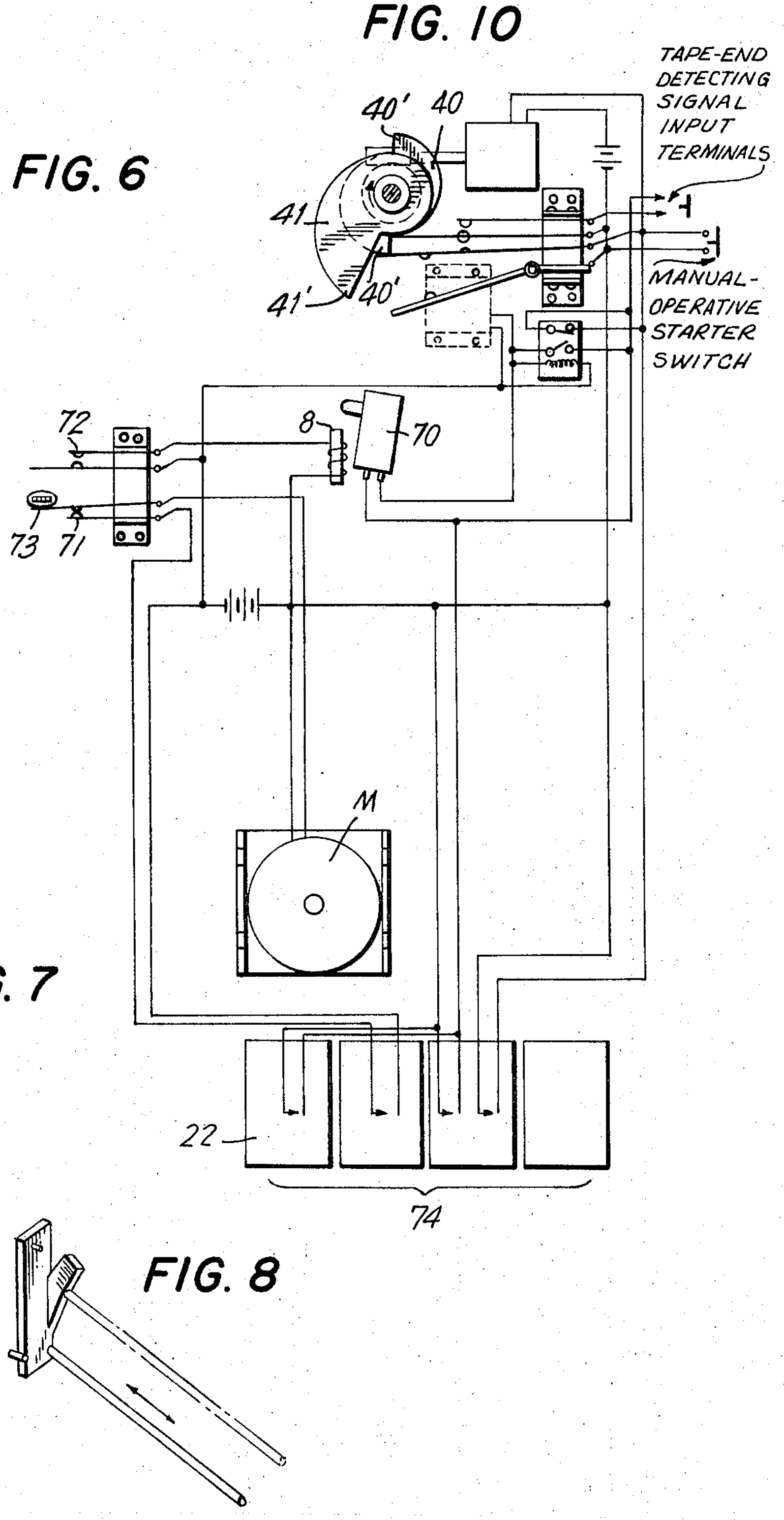
FIG. 8

TAPE RECORDER

CROSS RELATED APPLICATION

This application is a division of application Ser. No. 867,234, filed Oct. 17, 1969 and claiming the priority of various applications filed in Japan on Oct. 17, 1968 and Dec. 5, 1968.

The present invention relates to a tape recorder, more particularly, to a tape cassette loading tape recorder.

It is an object of the present invention to provide a novel and improved cassette type tape recorder wherein the direction of tape travel may be automatically reversed with the switching-over of the head channels from one to the other.

It is another object of the present invention to provide a novel and improved cassette type tape recorder in which the direction of tape travel may be automatically reversed and, at the same time, the head channels may be also automatically switched over from one to the other without any positional inversion or movement of the cassette between playing or recording of tape tracks.

It is a further object of the present invention to provide a novel and improved cassette type tape recorder in which the continuous playing of different tape tracks may be facilitated to permit utilization of successive tape tracks with no cassette inversion between playing of tape tracks.

It is another object of the present invention to provide a novel and improved cassette type tape recorder in which the continuous playing or recording of different tape tracks may be accomplished by an automatically rockable, operating lever, the rocking movement of which causes simultaneously the directional change of tape travel and the switching-over of the head channels.

It is another object of the present invention to provide a novel and improved cassette type tape recorder with a cassette loading mechanism to eliminate delays and other troublesome problems encountered in loading the tape cassette into the tape recorder.

It is still another object of the present invention to provide a novel and improved cassette type tape recorder having a fully automatic cassette loading mechanism in which the tape cassette is not be brought into co-operation with the tape recorder elements unless the cassette is loaded into the tape recorder in proper position or direction with respect to the position or direction in which the cassette is to be introduced into the tape recorder.

Other objects, features and advantages of the present invention will be pointed out in the following description and illustrated in the accompanying drawings, which disclose by way of example, the principle of the invention and the best mode which has been completed of applying that principle.

In the accompanying drawings:

FIG. 6 is an elevational view illustrating a tape recorder actuator mechanism for initiating the tape recorder, in which FIG. 6(*a*) is a view of the mechanism in its non-operative condition and FIG. 6(*b*) is a view of the same mechanism in its operative condition;

FIG. 7 is a side view of the tape recorder actuator mechanism, in the direction of arrows VII—VII in FIG. 6;

FIG. 8 is a perspective view showing a cam element which is incorporated in the mechanism shown in FIGS. 6 and 7;

FIGS. 9 and 10 are explanatory view of operational and control circuits employed in the cassette loading tape recorder according to the present invention;

Figures 2, 13, 15:
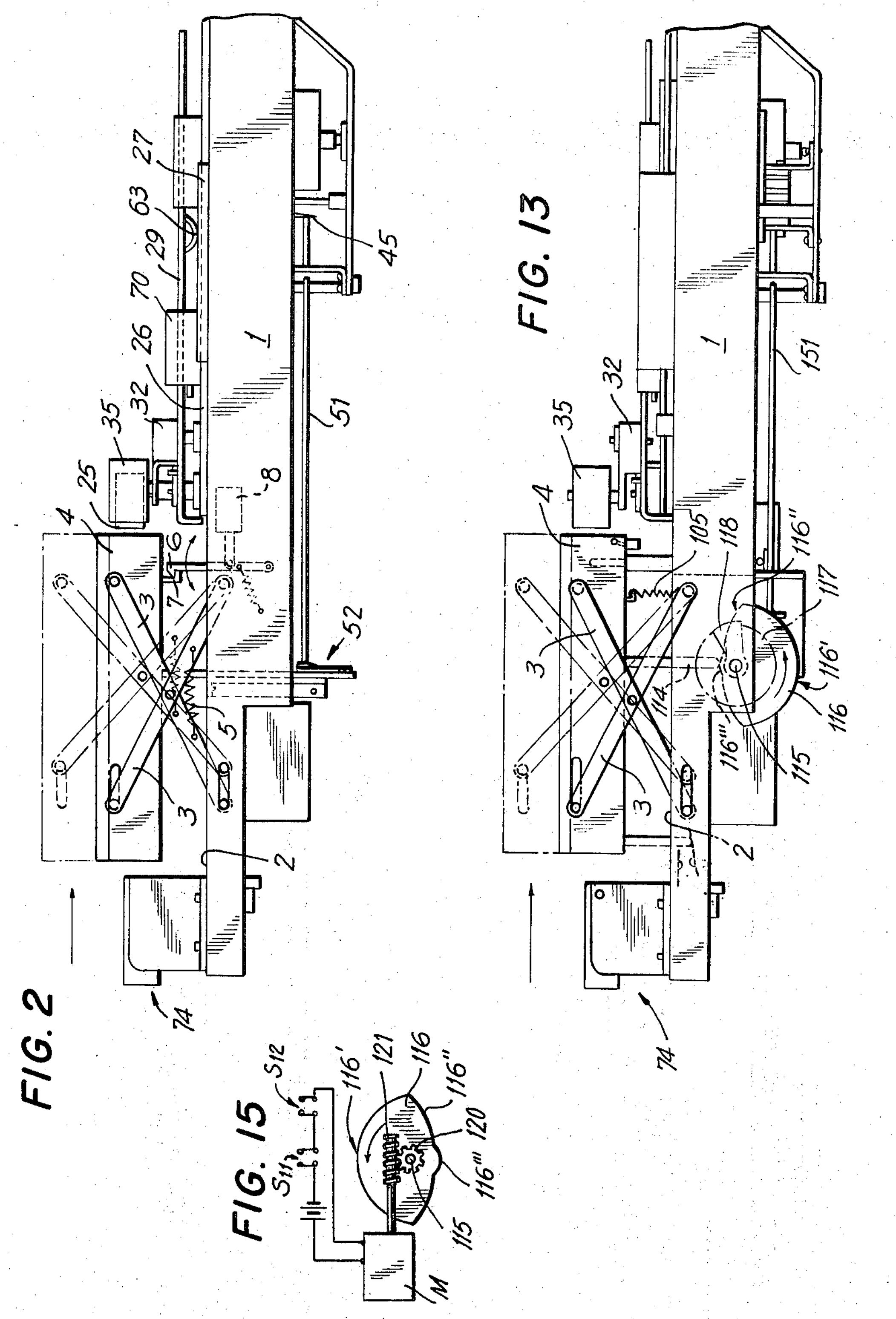
FIG. 2 is an elevational side view of the cassette loading tape recorder shown in FIG. 1.
Figures 5, 11:
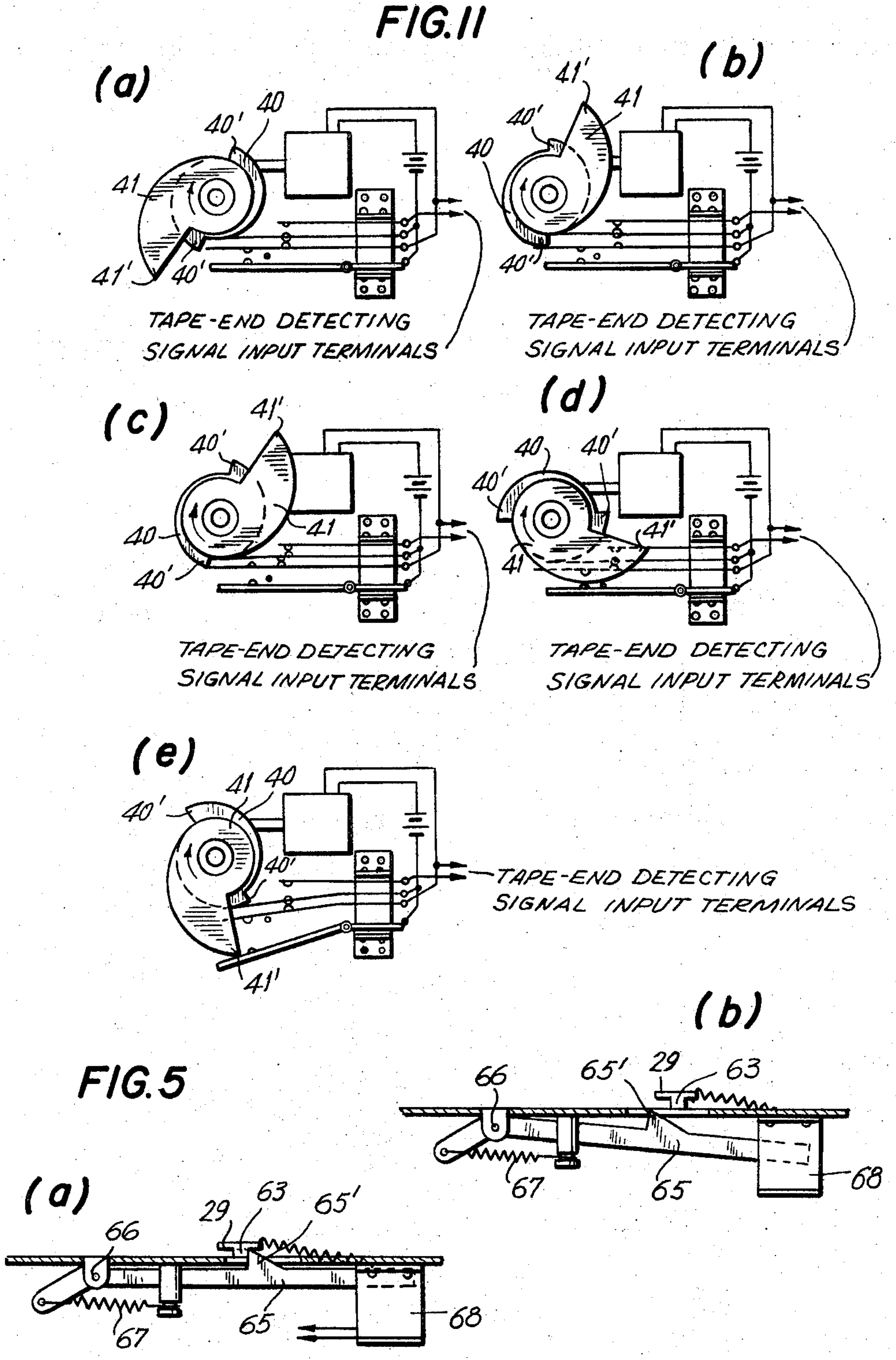
FIG. 5 is a schematic view showing a locking means for the rockable operating lever, in which FIG. 5(*a*) is a view showing the locked condition of the rockable operating lever and FIG. 5(*b*) is a view showing the released condition.
Figure 12:
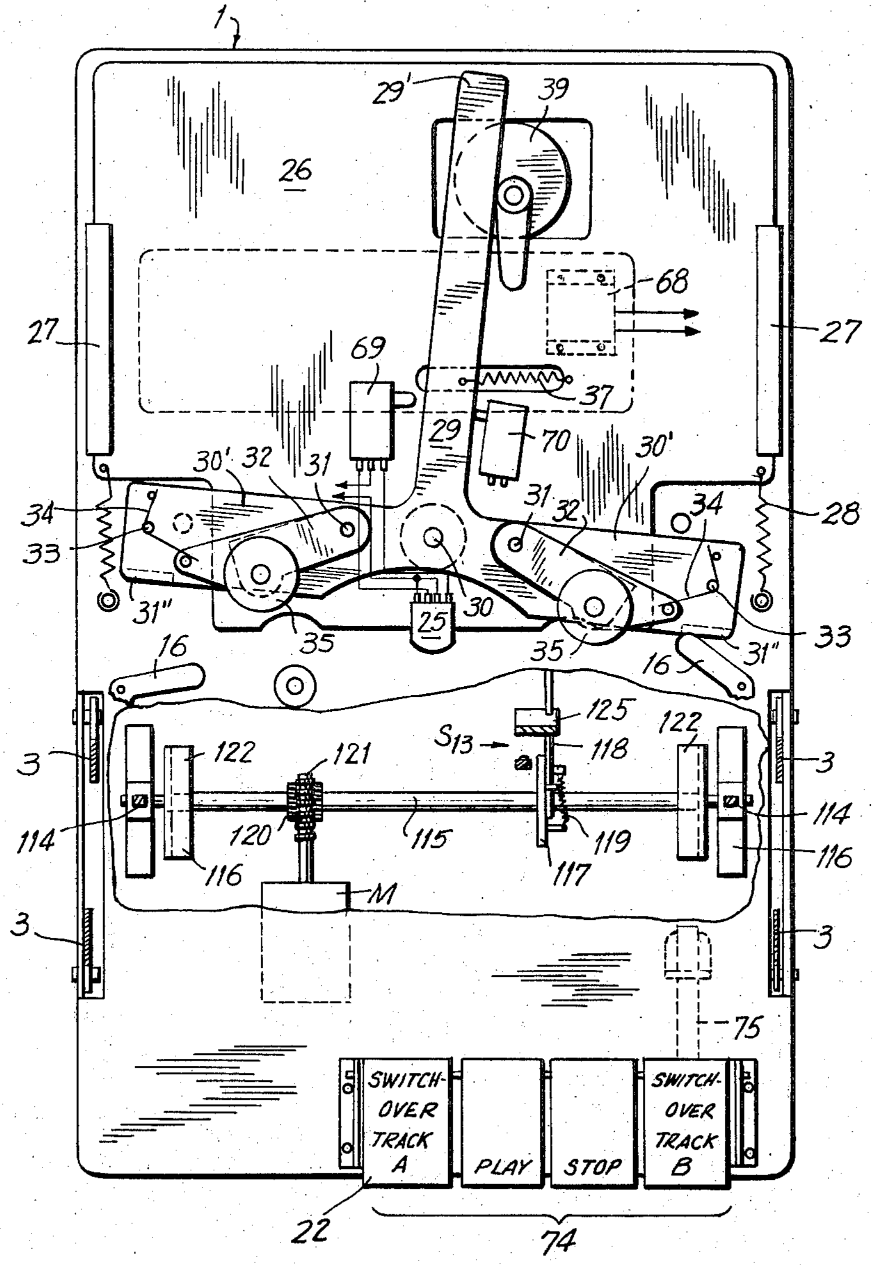
Figure 14:
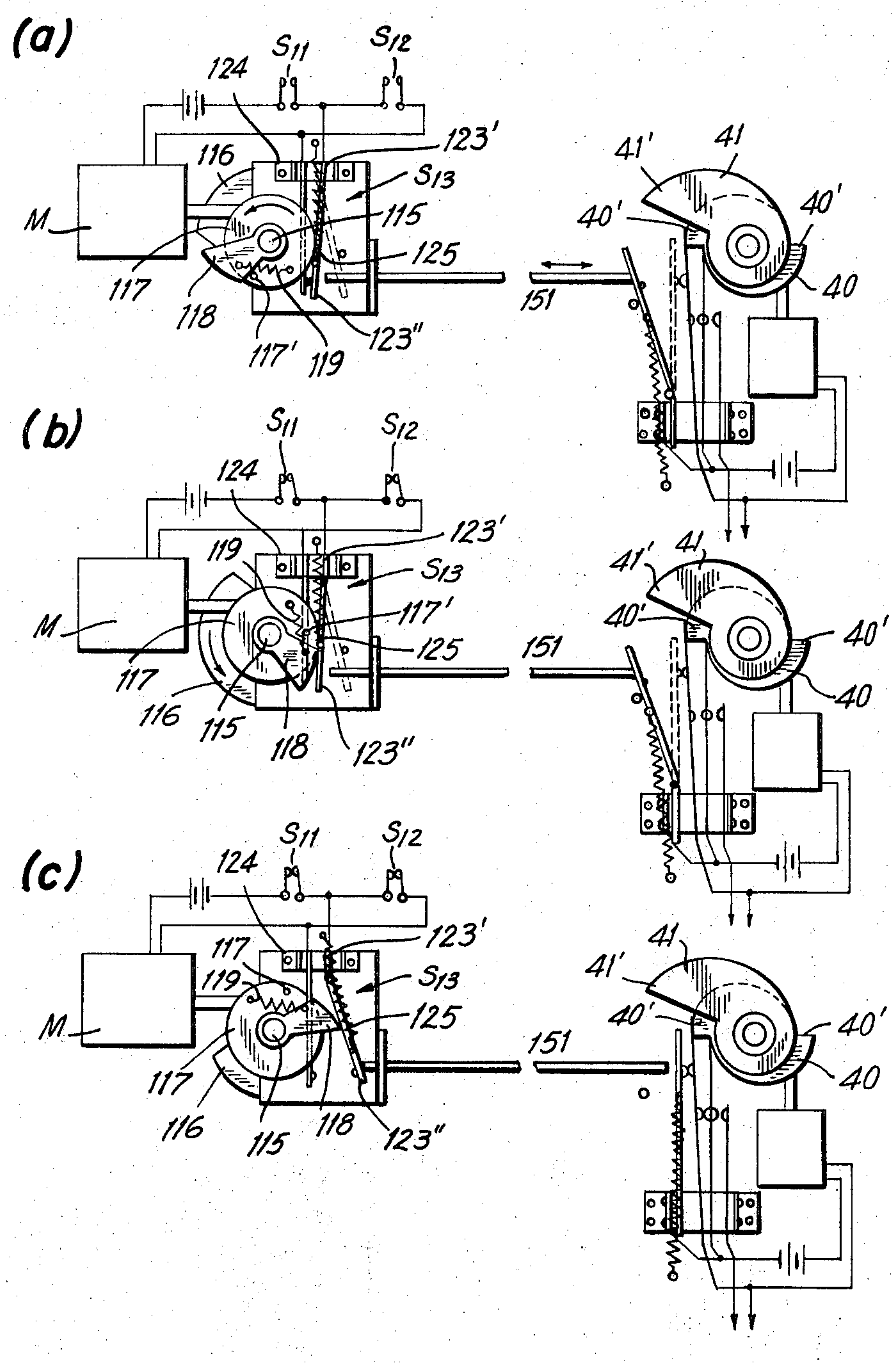

FIGS. 11 (*a*), (*b*), (*c*), (*d*) and (*e*) are schematic views explanatory of the operation of the electric contact elements to control the operational sequence of the tape recorder elements in the cassette type tape recorder according to the present invention;

FIG. 12 is a plan view showing the cassette type tape recorder according to the present invention provided with a modified cassette loading means of fully automatic type, with a part thereof being broken away to illustrate especially a cam mechanism associated with the cassette loading means;

FIG. 13 is an elevational side view showing the cassette type tape recorder of FIG. 12, with the cam mechanism associated with the cassette loading means being shown by phantom lines;

FIGS. 14(*a*), (*b*) and (*c*) are explanatory views of the co-operation of the cam mechanism for the cassette loading means with the cam mechanism for the tape recorder elements; and FIG. 15 is a schematic view illustrating another embodiment of the cam mechanism for the cassette loading means.

Referring firstly to FIGS. 1 to 4, therein is shown a cassette loading tape recorder according to the present invention including a tape recorder housing indicated generally at 1 in which elements of the tape recorder are encased in a compact manner. Above a base 2 composed of an upper horizontal panel of the housing 1, there is provided a cassette loading means 4 which defines a chamber for receiving therein a tape cassette. The cassette loading means 4 may be raised and lowered with respect to the base 2 through a pair of transversely opposed link mechanisms 3 each consisting of two arm members which are pivotally connected to each other in an X-shaped arrangement. The link mechanisms 3 are each biased by a tension spring 5 so as to normally resiliently keep the tape cassette loading means 4 in its raised position. Downwardly projected from the cassette loading means 4 is a hooked member 7 engageable with a locking member 6 provided on the tape recorder. It will be thus apparent that, when the tape cassette is lowered or depressed against the action of the tension springs 5 into its co-operative position with the tape recorder elements, the hooked member 7 is brought into engagement with the locking member 6 to hold the tape cassette loading means 4 in its depressed position. The locking member 6 is also operatingly connected to a solenoid 8, the operation of which will be hereinafter described in detail.

Figure 1:
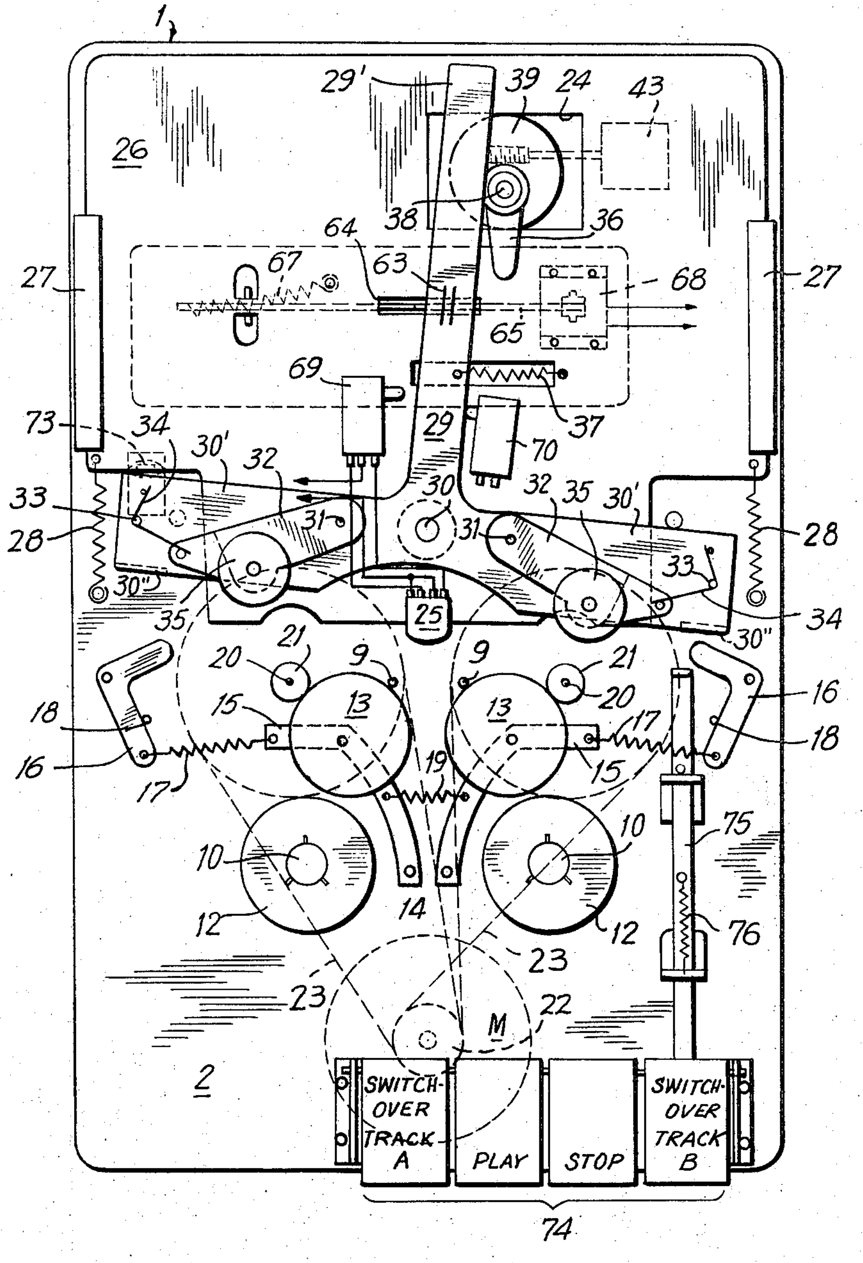
FIG. 1 is a plan view illustrating a cassette loading tape recorder according to the present invention, with a cassette loading means and a covering of a recorder housing being broken away for the purpose of exposing the details of the tape recorder elements.
Figure 3:
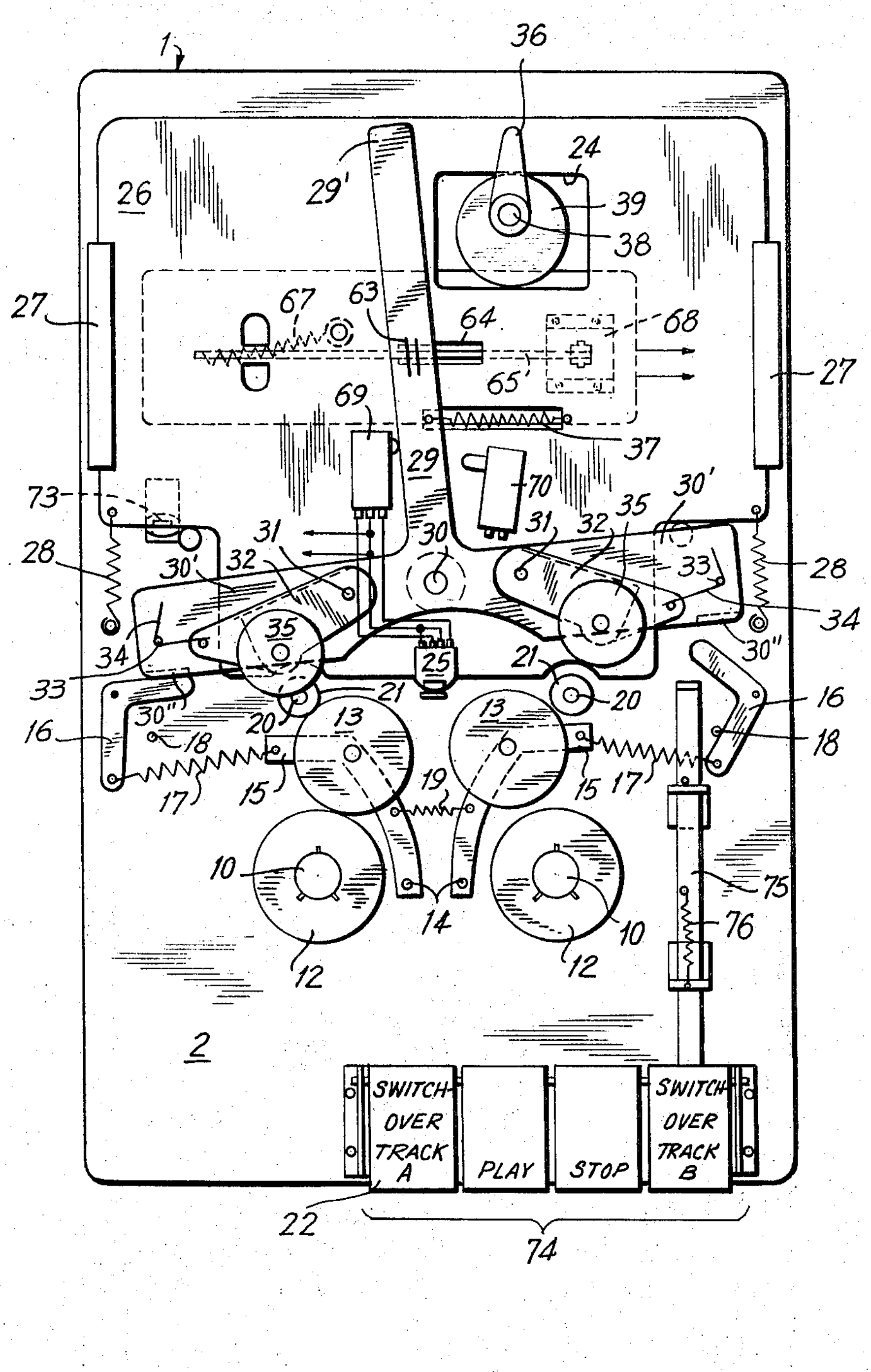
FIGS. 3 and 4 are, respectively, schematic plan views of the cassette loading tape recorder according to the present invention, in which views a rockable operating lever is shown in different positions.
Figure 4:
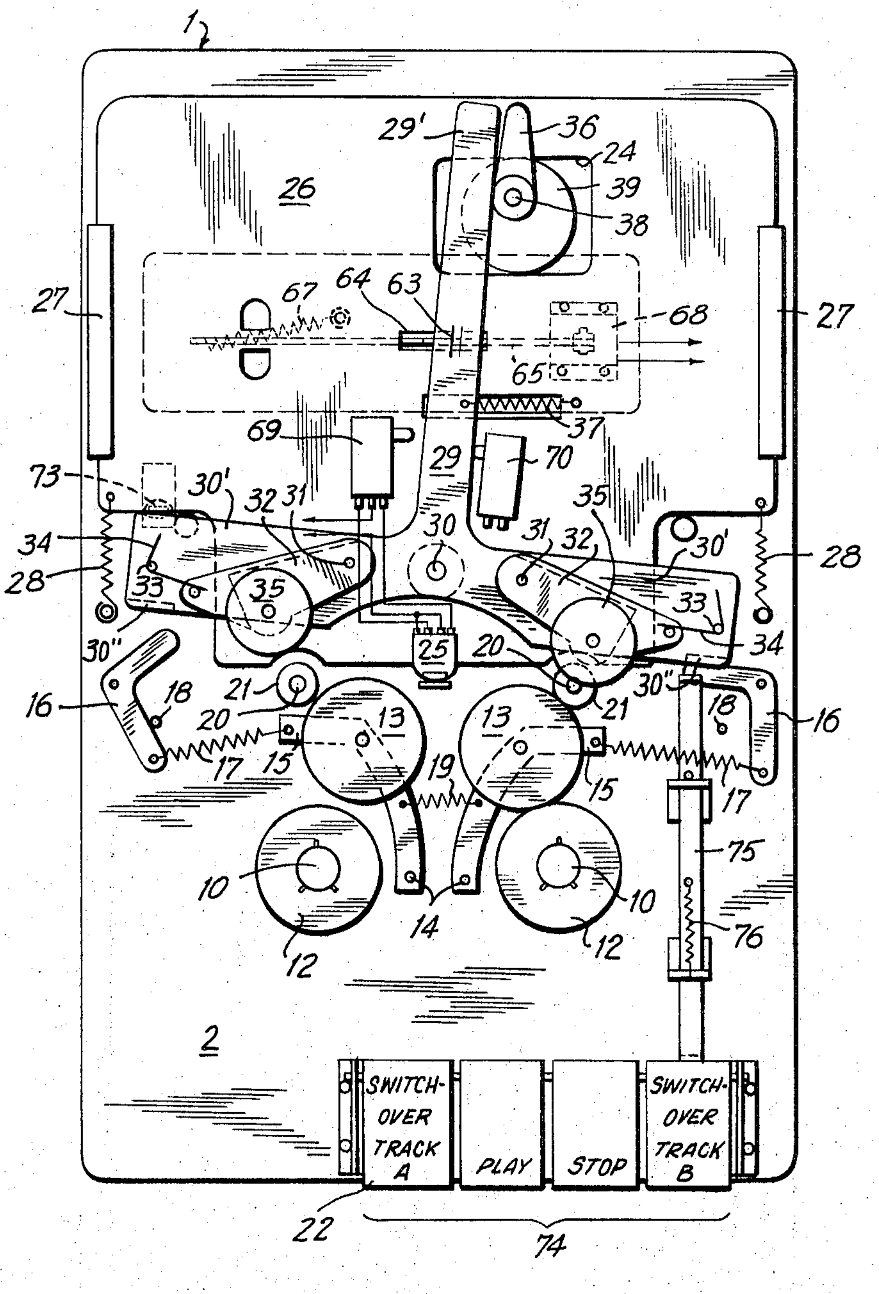

The tape recorder has, on the base 2 thereof, upright pins 9 by which the cassette loading means 4 upon its depression may be guided into precisely aligned relation for its normal operative position. On the base 2, further, there is provided a pair of transversely spaced tape reel shafts 10 and 11 on which central hub portions of tape reel housed in the cassette may be, respectively, fitted in such a manner that the tape reels may be moved axially therealong but held against rotation with respect to the reel shafts 10 and 11. It will be understood that the reel shafts 10 and 11 have, respectively, mounted thereon reel-supporting discs 12. In addition to the guide pins 9 and reel shafts 10 and 11, there are provided on the base 2 idler pulleys 13 which may be moved into or out of engagement with the peripheries of the reel-supporting discs 12. The idler pulleys 13 are, as shown in FIGS. 1, 3 and 4, each supported for freely rotating movement on rockable levers 15 which are each pivotally supported at one extremity on a pin 14 secured on the base 2 and connected at its opposite extremity to an L-shaped lever 16 through a tension spring 17. The L-shaped levers 16 are each arranged outside its associated rockable lever 15 and pivoted at its bent portion on the base 2 of the tape recorder housing 1. Moreover, the rockable levers 15 are interconnected through a tension spring 19 so as to have a tendency to move towards each other against the action of the tension springs 17. Thus, one of the L-shaped levers 16, which is located at the left side as viewed in FIG. 1, is urged to rotate in the counterclockwise direction about its pivoted portion, whereas the other is urged to rotate in the clockwise direction. The L-shaped levers 16 are each abutted against a pin 18 to limit the rotation range of the lever 16.

The idler pulleys 13 are frictionally engaged with capstan pulleys 21 which are each fitted on a capstan shaft 20 extended upwardly through the tape recorder housing 1. The capstan shafts 20 have pulley wheels 21′ which are drivingly connected, through endless belts 23, to pulleys 22 driven from a tape driving motor M in the tape recorder housing 1.

Further provided on the base 2 at its upper half-portion as viewed in FIG. 1, is a movable base plate 26 in such a manner that base plate 26 may be moved along guide rails 27 which are arranged in transversely spaced relation to each other and extend longitudinally of the tape recorder housing 1. The movable base plate 26 is urged, by the action of a pair of transversely opposed tension springs 28 each connected at its opposite extremities to the movable base plate 26 and the base 2, towards the location where the cassette is to be loaded.

The movable base plate 26 is provided therein with a substantially rectangular opening 24 in which an eccentric cam disc 39 is co-operatively received to thereby form a yoke cam, the function and operation of which will be hereinafter described in detail.

A magnetic head 25 is mounted on the movable base plate 26, said magnetic head 25 having a plurality of head channels arranged one upon the other.

Further provided on the movable base plate 26 is an operating means 29 which consists of a longitudinally extended arm member 29′ and a pair of transversely extended side arm members 30′, said three arm members being integrally formed into a T-shaped configuration in a plan view thereof. The operating means 29 is pivotally supported at 30 on the movable base plate 26 in a freely rockable manner. Lever elements 32 are mounted, at their inner ends, for pivotal movement on the side arm members 30′ by means of pivot pins 31 on the side arm members. These lever elements 32 are resiliently biased to rotate towards one another about the pivot pins 31 by means of springs attached on pins 33 on the side arm members 30′.

The lever elements 32 also have, respectively, mounted thereon pinch rollers 35 which may be alternately engaged with the capstan shafts 20, depending upon whether the operating means 29 is rockingly moved to the left or the right. The outer ends 30″ of the side arm members 30′ are both designed for alternate abutment against the L-shaped levers 16, depending upon the rocking movement of the operating means 29. The longitudinal arm portion 29′ of the operating means 29 is always abutted, at one side face, against an elongated cam element 36 which is mounted on a rotating shaft 38 and projecting in a direction perpendicular to the shaft 38. A tension spring 37 is provided between the longitudinal arm portion 29′ and the base 2 to keep the arm portion 29′ in positve engagement with cam element 36.

The rotating shaft 38 has also mounted thereon eccentric cam disc 39 for driving forwardly and backwardly the movable base plate 26 along the guide rails 27.

Figure 9:
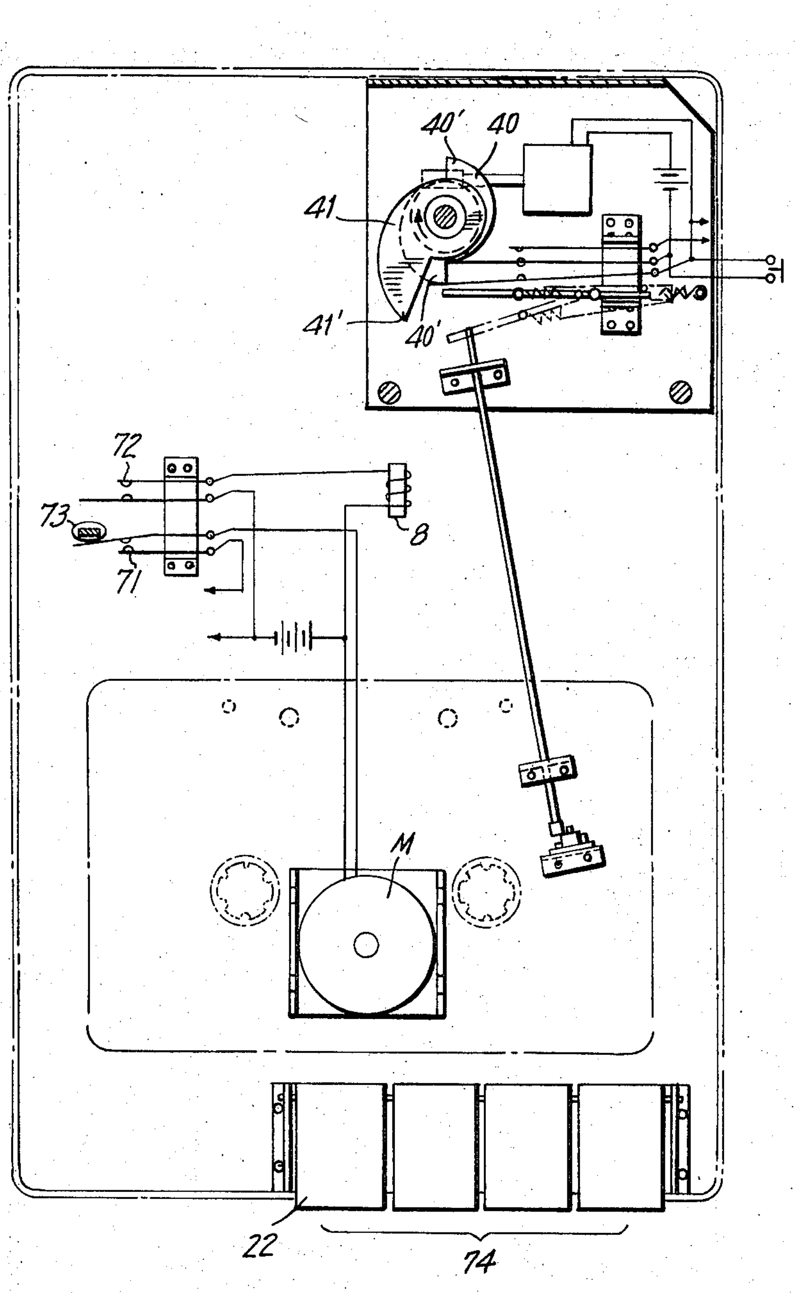

Next, referring to FIGS. 9 and 10, the rotating shaft 38 provided with the eccentric cam disc 39 and elongated cam element 36 has mounted thereon a first cam member 40 having raised portions 40′ which are opposed diametrically on this cam member. The rotating shaft 38 has further mounted thereon a second cam member 41 having a single raised portion 41′ which is larger than that of the first cam member 40. These cam members 40 and 41 are co-axially superposed one upon the other and arranged so as to accomplish sequentially the tape recorder operations as will be hereinafter described in detail.

In addition to these two cam members 40 and 41, there is also provided on the rotating shaft 38 a worm gear 42 which is in mesh with a worm wheel 44 secured on an output shaft of an electric motor 43.

Mounted on the tape recorder housing 1 in juxtaposition are a group fo contact elements consisting of a first over-the-center type movable contact element 45 arranged so as to co-operate with the raised portion 41′ of the second cam member 41, second and third resilient contact elements 46 and 47 arranged so as to co-operate with the first cam member 40, a fourth stationary contact element 48 disposed in engageable alignment with the third resilient contact element 47. These contact elements are connected in an electric circuit which will be hereinafter described.

The over-the-center type contact element 45 engageable with the second cam member 41 is composed of a stationary blade portion 45′ carried in a cantilever manner at its base end, a rockable blade portion 45″ pivotally connected to the free end of the stationary blade portion 45′, and a tension spring 50 provided between said blade portions 45′ and 45″ to keep the rockable blade portion 45″ normally in alignment with the stationary blade portion 45'. Thus, when the rockable blade portion 45" of the over-the-center type contact element 45 is laterally forced by the raised portion 41' of the second cam member 41 which is now rotating in the direction of the arrow in FIGS. 9 and 10, the rockable blade portion 45" is rapidly rocked in a snap-acting manner towards a position where it is out of engagement with the second cam member 41. The rockable blade portion 45", upon being forced laterally in a snap-acting manner, is brought into a position which causes axial movement of a rod 51 which is horizontally supported in the tape recorder housing 1 in an axially displaceable manner. It will be understood, from FIGS. 9 and 10, that the rod 51 has axially opposite extremities, one of which may be abutted against the rockable blade portion 45" end the other of which is in association with a tape recorder actuator mechanism, generally indicated at 52, energized upon loading of the cassette.

The details of the tape recorder actuator mechanism 52 will be now described with reference with FIGS. 6 to 8. The tape recorder actuator mechanism 52 includes a mounting member 53 secured to the lowest or inner surface of the base 2 in a downwardly extended manner. The mounting member 53 has a guide pin 55 projecting into an elongated slot 54' provided in a slide plate 54 which is arranged alongside of the mounting member 53 and exposed outwardly of the base 2 through an opening provided in the base 2. The slide plate 54 is movable in a vertical direction between a raised position and a lowered position. There is also provided a tension spring 56 which is connected, at its opposite ends, to the lower end of the slide plate 54 and the base 2 so that the slide plate 54 is normally urged by the tension spring 56 towards its raised position where the upper portion of the slide plate 54 is largely projected above the base 2. A cam member 59 (particularly refer to FIGS. 7 and 8) is pivotally mounted on the slide plate 54 through a pivot pin 60. The cam member 59 has on its longitudinal side edge an inclined cam surface 57 which extends upwardly and outwardly from the lowest end of the cam member 59 in a plane perpendicular to a plane including the cam member 59 or slide plate 54 and which terminates, at its upper end, into a relief face 58 bent laterally. The cam member 59 is also urged by a spring means 61 so as to rotate in the clockwise direction, as viewed in FIG. 6, onto a stopper pin 62 which is on the slide plate 54.

The rod 51 is, at one axial end, abutted against the inclined cam surface 57 in a freely, relatively sliding manner and, before loading of the cassette on the tape recorder, positioned at the lowest point of the inclined cam surface 57 as shown in FIGS. 6 and 8 in solid lines.

Referring next to FIGS. 1, 3, 4 and 5, the rockable operating means 29 is provided at the longitudinal arm member 29' with a downwardly-extended lug 63, while the movable base plate 26 has a transversely-extended slot 64 at a position just below the lug 63. Pivotally mounted on the lower surface of the movable base plate 26 through a horizontal pin 66 is a locking bar 65 having a locking hook 65' which may be projected upwardly through the slot 64 into engagement with the lug 63 of the rockable operating means 29. The locking bar 65 is, at one extremity, connected to a tension spring 67 so as to be biased to a position where the locking hook 65' is projected above the movable base plate 26. The locking bar 65 is operatingly connected at its other end to an electromagnetic means 68 which, upon energization, causes the locking bar 65 to move downwardly against the action of the tension spring 67 with the result that the locking hook 65' is out of engagement with the lug 63 of the rockable operating means 29.

In the present tape recorder, there are provided four switch means, namely, a first switch means 69 for switching over the head channel from one to the other; a second switch means 70 for detecting that either tape track A or B is in co-action with the magnetic head 25 said second switch means being designed so as to be closed upon leftwise-rocking of the operating means 29 as shown in FIG. 3 while opened upon rightwise-rocking of the operating means 29 as shown in FIG. 4; a third switch means 71 which may be closed upon forward movement of the movable base plate 26 for preventing the capstan shaft 20 from being driven prior to engagement of the pinch roller 35 with its associated capstan shaft 20; and a fourth switch means 72 connected operatingly to the solenoid 8 which is energized to release the cassette loading means 4 from the lock member 6. It is to be further noted that the third and fourth switch means 71 and 72 are closed by a pin 73 secured to the movable base plate 26.

Reference numeral 74 represents a group of manually operating buttons, among which a "Track B, Switch-Over" button is connected to an axially-movable push rod 75 which is normally urged by a tension spring 76 towards the said button and which may be, upon manual depression of said button, thrust against the spring 76 to the side arm member 30'.

In operation, with the cassette loading means 4 in which the tape cassette has been inserted horizontally in the direction of the shown in FIG. 2 being depressed towards the base 2 of the tape recorder, the cassette loading means 4 causes the slide plate 54 to move downwardly against the action of the tension spring 56. Upon the cassette loading means 4 being positively fitted on the reel-shafts 10 and 11, guide pins 9 and capstan shafts 20 which are on the base 2, the hooked member 7 is brought into engagement with the locking member 6 whereby the cassette loading means 4 is held or kept in its operative position. While, downward movement of the slide plate 54 causes action of the cam surface 57, which results in axial movement of the rod 51, the foremost end of which is then forcibly thrust against the rockable blade portion 45" of the over-the-center type contact element 45 as shown in FIG. 9.

When the slide plate 54 is completely depressed to its lowered position, the rod 51 is out of engagement with the cam surface 57 as shown in FIG. 6(*a*).

The rockable blade portion 45", thus thrust by the rod 51, rapidly snaps into alignment with the stationary blade portion 45' whereby the first contact element 45 is thrown into contact with the second resilient contact element 46 to thereby establish the electric circuit which causes the motor 43 to energize. Thus, the motor 43 drives the rotating shaft 38 together with the cam elements and cam members 36, 39, 40 and 41 through the worm gearing 42 and 44 in the direction indicated by the arrow in FIGS. 9 and 10, so that the eccentric cam disc 39 causes advance of the movable base plate 26 towards the cassette loading means 4 which has been loaded on the tape recorder.

When the rotating shaft 38 makes rotational motion through a predetermined angle, the second resilient contact element 46 which has been in engagement with the first cam member 40 up to this time as shown in FIG. 9 is released from one of the raised portions 40' and turned into contact with the third resilient contact element 47, as shown in FIG. 11(*a*), whereby the energization of the motor 43 continues. When the motor 43 causes the first cam member 40 to rotate through an additional 180°, the third resilient contact element 47 is released from the other of the raised portions 40' whereby the second and third contact elements 46 and 47 are spaced apart from each other with the result that the motor 43 is deenergized. In this case, the third contact element 47 is turned into contact with the fourth contact element 48, as shown in FIG. 22(*b*), and the motor 43 is at a standstill.

Upon the motor 43 coming to a standstill, the movable base plate 26 completes its advancing travel or stroke and the pin 73 on the movable base plate 26 causes the action which closes the switch means 71 so that the motor M for feeding the tape from one to the other of the tape reels is ready for actuation.

On the other hand, rotation of the cam element 36 mounted on the rotating shaft 38 driven from the motor 43 results in the rocking movement of the operating means 29 counter-clockwise or leftwards, as viewed in FIG. 1, against the tension spring 37. Here, the operating means 29 is kept or locked in its leftwise-rocked position, as shown in FIG. 3, by engagement of the lug 63 with the locking hook 65' of the locking bar 65 which is biased upwardly by the action of the tension spring 67. In this condition, the switch means 69 is switched over by the longitudinal arm member 29' to the condition where the magnetic head 25 is brought into coaction with one of the tape tracks A and B, for instance, the track A for play-back or recording. It will be understood that one of the pinch rollers 35, namely, the left-handed pinch roller 35 as viewed in FIG. 1 is now in contact or engagement with its associated or left-handed capstan shaft 20.

Now, when the "play-back" button is manually depressed, the motor M for tape feed is actuated whereby the play-back or recording of the tape track A is carried out.

Then, upon completion of the play-back or recording on the tape track A, a tape-end detecting switch means (not shown) is actuated to close tape-end detecting signal input terminals whereby the electric current flows through a circuit including a normally closed switch S', the switch means 70 and a relay coil LC, to thereby cause energization of the electromagnetic means 68. Thus, this results in unlocking the operating means 29 out of the locking hook 65' of the locking bar 65 and, consequently, the operating means 29 is rockingly moved clockwise or rightwards, as viewed in FIG. 1, into the rightwise-rocked position as shown in FIG. 4, so that the right-handed pinch roller 35 is alternately pressed against its associated capstan shaft 20.

While the electric current to energize the electromagnetic means 68 as described above is simultaneously applied to the fourth contact element 48, such current applied to the fourth contact element 48 will be cut off without delay because the normally closed switch S' is turned to the opened condition by means of the relay coil LC, so that the rotational motion of the cam element 39 caused by such electric current will be substantially nil. Thus, even if the circuit for the motor 43 is instantaneously turned on due to the electric current derived from the tape-end detecting signal, the movable base plate 26 will have no additional movement.

It will be further understood that the switch means 70 for detecting whether either tape track A or B is in coaction with the head channel is closed upon the rightwise-rocking movement of the operating means 29. However, since the normally opened switch S is closed and in parallel, the electromagnetic means 68 is left energized and the motor 43 is at rest inasmuch as the tape-end detecting signal is applied.

In this manner, the clockwise-rocking movement of the operating means 29 results in switching over the switch means 69 to the condition where the magnetic head 25 is alternately thrown into co-operation with the tape track B, so that the tape is reversely fed by association of the right-handed capstan shaft with its corresponding pinch roller whereby the play-back or recording is carried out along the tape track B.

Upon completion of play-back or recording on the tape track B, the tape-end detecting switch means (not shown) is again actuated to open the tape-end detecting signal input terminals whereby electric current is applied to the motor 43. In this condition, the cam members 40 and 41 take the position as shown in FIG. 11(*b*). Therefore, the motor 43 energized by the electric current derived from the tape-end detecting signal causes the cam members 40 and 41 to successively rotate into the sequential cam positions as shown in FIGS. 11(*c*), (*d*) and (*e*). During such rotation of cam members or rotating shaft, the eccentric cam disc 39 causes backward movement of the movable base plate 26 with the right-handed pinch roller 35 being out of engagement with its associated capstan shaft 20.

In the course of such backward movement of the movable base plate 26, the operating means 29 is held in its rightwise-rocked position by the action of the tension spring 37 with no rotation of the cam element 36 so that the switch means 70 is left opened and normally closed switch S' is also opened, whereby the motor 43 is maintained in its energized condition.

When the movable base plate 26 makes backward movement as described above, further, the downwardly extended pin 73 of the movable base plate 26 results in the closing of the switch means 72 to energize the solenoid 8 which in turn releases the hooked member 7 of the cassette loading means 4 from the locking member 6 whereby the cassette loading means 4 is permitted to move rapidly upwardly to its raised or non-operative position in which the tape cassette may be withdrawn from the cassette loading means 4.

On the other hand, the raised portion 41' of the second cam member 41 which is rotated to the predetermined position as shown in FIG. 11(*e*) forcibly urges the rockable blade portion 45'' of the over-the-center type contact element 45 radially outwardly of the cam member 41 to its relieved position, so that the rockable blade portion 45'' rapidly snaps to its relieved position which quickly acts upon its associated extremity of the rod 51 so as to thrust the latter 50 to its initial position where the opposite extremity of the rod 51 is abutted against the lowest end of the inclined cam surface 57 on the cam member 59 which has been yieldingly restored to its raised or initial position together with the slide plate 54 upon ejection of the cassette loading means 4. Thus, the tape recorder elements are now ready for loading of a new tape cassette.

In addition, the motor 43 for driving the movable base plate 26 will be deenergized at the time when the first cam member 40 rotates to the position as shown in FIG. 11(*e*) and thus the third contact element 47 is relieved from the raised portion 40' of the cam 40.

If it is desired, for instance, to play the same tape portion over again in the course of play-back along the tape track A, a "Track A, Switch-Over" button is manually depressed and then, following feed-back of the tape, the "Track B, Switch-Over" button is depressed whereby the push rod 75 is forwardly thrust to the outer end 30'' of the side arm member 30', as the result of which the operating means 29 is turned counterclockwise to the initial position where the playing of track A may be carried out. Where the replaying is desired in the course of play-back of the track B, it is sufficient to reverse merely the operations as described above.

If it is further desired, for instance, to discontinue the play-back operation of track A and withdraw the tape cassette out of the tape recorder, a "Stop" button is manually depressed. As a result, a "Play" button is mechanically released from its depressed condition and at the same time both switches $S_1$ and $S_0$ are closed. Thus, closing of the switch $S_1$ results in energization of the electromagnetic means 68 which in turn unlocks the operating means 29 form the locking hook 65' whereby the operating menas 29 is rockingly moved clockwise by the action of the tension spring 37 to its rightwise-rocked position, while closing of the switch $S_0$ causes the motor 43 to energize thereby moving the movable base plate 26 backwardly, as the result of which the switch means 72 is closed to release hooked member 7 from the locking member 6 of the cassette loading means 4 which is in turn ejected upwardly by the action of the tension spring 5.

Where it is desired to discontinue the play-back operation of track B and to withdraw the cassette from the tape recorder, the Stop button is manually depressed. The following operations are similar to that already described just above, except that the electromagnetic means 68 is not energized because the switch means 70 is in opened condition.

It will be appreciated that changing-over of the tape tracks A and B from one to the other is effected by merely depressing the Switch-Over, Track A button or the Switch-over, Track B button.

It is, of course, preferable that the cassette loading means is provided with a cassette ejector mechanism which may be actuated at the time when the cassette loading means reaches its raised or non-operative position whereby the cassette is automatically withdrawn from the cassette loading means.

While the previously described cassette type tape recorder contemplates a cassette loading means of such type that it is manually depressed to its operative position where the magnetic head may co-operate with the tape in the cassette to effect the play-back or recording operation, it will be understood that the fully automatic type cassette loading means may be also incorporated into the tape recorder.

FIGS. 12 – 15 illustrate a preferred embodiment of the cassette type tape recorder provided therein with a fully automatic type cassette loading means which may be automatically brought into its operative position by merely introducing the tape cassette into the cassette loading means. Most of the components of the tape recorder are the same as previously described. To that extent, the components have been given the same reference numerals and characters, so that the previous description will be applicable. The present description will be largely confined to the cassette loading means of fully automatic type.

Referring now to FIGS. 12 to 14, the tape cassette loading means 4 in which the tape cassette is horizontally introducible in the direction of the arrow shown in FIG. 12, is arranged just above the base 2 of the tape recorder housing 1 in the same manner as previously described in connection with FIG. 2, except that the tension spring 5 is eliminated and replaced by another tension spring 105 which urges the cassette loading means 4 downwardly to its lowered or operative position. The tension spring 105 is extended between the lower surface of the cassette loading means 4 and the base 2 of the tape recorder housing 1.

The cassette loading means 4, which is thus urged downwardly by the action of the tension spring 105, is provided with a downwardly projecting prong 114 which is, at its lowest end, supported in a freely sliding manner on the periphery of a cycle cam element 116 resembling an eccentric cam, said cycle cam element 116 being fixed on a transversely extended horizontal rotating shaft 115 which is supported in the tape recorder housing 1 through bearing blocks 122 and 122. The cycle cam element 116 comprises, as shown in FIG. 13, a higher dwell portion 116' of a substantially semi-circular configuration, a lower dwell portion 116''' having a substantially semi-circular configuration and being arranged in diametrically opposite relation to said higher dwell portion 116', and further a pair of slightly-depressed portions 116'' and 116'' each merged at its opposite extremities with said dwell portions 116' and 116'''. Further provided on the rotating shaft 115 in concentricity with the cycle cam element 116 is a fixed disc 117 which has an axial pin 117' on one side. A lobe-like cam element 118 is loosely fitted on the rotating shaft 115 in closely facing relation to the pin-supporting side of the disc 117. The lobe-like cam element 118 is biased in the same direction as the rotational direction of the shaft 115 against the pin 117' by means of a tension spring 119 which is extended between the lobe-like cam element 118 and the disc 117. Further provided on the rotating shaft 115 is a worm gear 120 which is in mesh with a worm wheel 121 on an output shaft of an electric motor MO.

The motor MO is connected in series with a normally opened switch $S_{11}$ adapted to be closed upon insertion of the tape cassette into the cassette loading means 4 and also with a normally closed lower-limit switch $S_{12}$ adapted to be opened at the time when the cassette loading means 4 reaches its lowered or operative position. Moreover connected in parallel with the switches $S_{11}$ and $S_{12}$ is a third switch $S_{13}$ including an over-the-center type movable contact 123 which is normally extended in tangency with the circular orbit of the lobe-like cam element 118. The over-the-center type contact 123 comprises a fixed blade portion 123' supported cantileverally on an insulator block 124, a rockable blade portion 123'' carried pivotally from the free end of the fixed blade portion 123', and a tension spring 125 extended between the fixed blade portion 123' and the rockable blade portion 123'' so as to normally keep the rockable blade portion 123'' in alignment with the fixed blade portion 123'. It will be thus appreciated that the rockable blade portion 123'', when being laterally forced by the lobe-like cam element 118, snaps rapidly to its relieved position.

A rod 151 is provided in an axially movable manner, one axial end of rod 151 being in closely faced relation to the over-the-center type contact 123, particularly, to the rockable blade portion 123'' which is in alignment with the fixed blade portion 123'. On the other hand, the opposite axial end of the rod 151 is in closely faced relation to the other over-the-center type contact 45 previously described. From the foregoing, it will be understood that the operation and arrangement of rod 151 is the same as that of the rod 51 previously described.

In operation, the tape cassette inserted completely into the cassette loading means 4 effects closing of the switch $S_{11}$ to thereby energize the motor MO which in turn causes the rotating shaft 115 to drive together with the cycle cam element 116, fixed disc 117 and lobe-like cam element 118.

Firstly the operation of the cycle cam element 116 will be considered. When the cassette is not yet received in the cassette loading means 4, the cycle cam element 116 is in the position, as shown in FIG. 14(*a*), where the higher dwell portion 116' is in an upper position and the lower dwell portion is in a lowest position. In this cam position, therefore, the cassette loading means 4 mounted on the cam follower or downwardly-projecting prong 114 is kept in its raised or non-operative position as shown by the phantom lines in FIG. 13. Upon the commencing of rotation of shaft 115 in such a manner as described above, the follower or downwardly-projecting prong 114 runs on the cam surface and descends together with the cassette loading means 4 according to the angular displacement of the cam position. As soon as the cycle cam element 116 is rotated to the cam position ao shown in FIG. 14(*c*), namely, to the reverse position relative to the initial position shown in FIG. 14(*a*), the cassette loading means 4 is brought into its lowered or operative position and at the same time the normally closed limit-switch $S_{12}$ is turned off by a suitable means attached on the lower surface of the cassette loading means 4 whereby the motor is deenergized with the result that the cassette loading means 4 is held in its operative position as shown in FIG. 13 in solid lines.

Next the operation of the lobe-like cam element 118 will be explained. With the rotating shaft 115 commencing rotation, the lobe-like cam element 118 is also permitted to rotate in the same direction as the rotating shaft 115 because it is yieldingly connected through the tension spring 119 with the disc 117 fixed on the shaft 115. Then, the lobe-like cam element 118 is gradually forced against the rockable blade portion 123'' of the over-the-center type contact 123 and thus delayed in the angular motion relative to the disc 117, with the result that the tension spring 119 has developed therein a predetermined tension stress to overcome the bias of the spring 125. When this spring bias is exceeded, the rockable blade portion 123'' snaps rapidly to its relieved position which quickly moves the rod 151 axially to allow it to rapidly actuate the over-the-center type contact 45 for the tape recorder operation as already described above.

It will be apparent that the lobe-like cam element 118 is, after the snap-action of the over-the-center type contact 123, yieldingly restored to its normal position thereby being abutted against the stopper pin 117'.

Upon completion of the play-back operation, the rod 151 is reversely moved by the action of the over-the-center type contact 45 which snaps to its relieved position in the manner previously described. Thus, the rod 151 permits the over-the-center type contact 123 to snap rapidly towards its normal position whereby the switch $S_{13}$ is turned on to energize the motor MO which in turn drives the rotating shaft 115. This causes rotation of the cycle cam element 116 so that the cassette loading means 4 is gradually moved upwardly to its raised or non-operative position as shown in FIG. 13 in phantom lines. Upon the cassette loading means 4 reaching its raised position, withdrawal of the cassette results in deenergization of the motor MO whereby the cam elements 116 and 118 are reset to their initial cam positions as shown in FIG. 14(*a*).

If the cassette is now introduced into the cassette loading means 4 in incorrect position or direction as compared to the proper position or direction which the cassette should be introduced into the cassette loading means 4, the normally opened switch $S_{11}$ is similarly closed to thereby energize the motor MO and, therefore, the cycle cam element 116 and lobe-like cam element 118 are rotated in the manner as described above. However, the tape recorder elements such as the capstan shafts, reel shafts and the like can't be fitted in their corresponding bores so that the cassette loading menas 4 may be brought to its proper operative position and the limit switch $S_{12}$ is left closed. As a result, the motor MO continues its energization whereby the cycle cam element 116 is continuously rotated to allow the cassette loading means 4 to return immediately to its raised or non-operative position.

Referring next to FIG. 15, therein is shown a modification of the cam mechanism in which the over-the-center type contact is eliminated and therefore only the switches $S_{11}$ and $S_{12}$ are connected in series with the motor MO. This modification is adaptable to a tape recorder in which the play-back or recording mechanism is operated separately from loading of the cassette.

While the present invention has been shown and described with reference to preferred embodiments thereof, it will be appreciated that changes and modifications may be made from a knowledge of the teachings of the present invention which do not in truth and in fact depart from the concepts of the invention. Hence the invention is not be limited or restricted to precisely what is shown and described, but rather should be construed in the light of the fundamentally new principles as embodied in the teachings disclosed herein.

What is claimed is:

1. In a tape recorder which employs a tape cassette and includes elements to cooperate with the tape, in combination:

a cassette loading means adapted to receive said tape cassette, said cassette loading means being supported on the tape recorder for movement between a raised position where said tape cassette may be introduced into said cassette loading means and a lowered position where said cassette is in a recording or playback position, means by which said cassette loading means is yieldingly biased to said lowered position;

a rotatable cycle cam element, means connecting said cam element to said cassette load means such that rotation of said cam element results in linear movement of said cassette loading means between said raised and lowered positions, a motor to drive said cycle cam element, a normally open switch which controls said motor, means to close said switch upon reception of said tape cassette into said cassette loading means, and a normally closed switch which also controls said motor, means to open the latter switch when said cassette loading means reaches its lowered position;

a lobe-like cam element arranged in co-axial relation with said cycle cam element;

a normally closed third switch connected in parallel with the two first said switches to continue energization of said motor by by-passing the first and normally closed switch, said normally closed third switch including an over-the-center type contact which is operated by said lobe-like cam element to open said third switch;

a rod arranged so as to be thurst axially by said over-the-center type contact when the latter is operated;

a movable base plate adapted to move forwardly to said cassette loading means, with the latter in its lowered position, an eccentric cam dis to move said base plate forwardly and rearwardly, a motor which drives said eccentric cam disc, a switch means which operates said motor and which is operated by an axial thrust of said rod;

motor switch means including contacts, a cam member which abuts said contacts and which includes diametrically opposed rise portions, a cam shaft, said cam member being operatingly connected to said eccentric cam disc through said cam shaft so that said eccentric cam disc can control forth-and-back movement of said movable base plate;

a pair of capstan shafts for feeding the tape in opposite directions to tape travel, respectively, and pinch rollers for engaging with said shaft;

a rocking base plate for rocking movement between a first operating position where one of said pinch rollers is in engagement with its associated capstan shaft and a second operating position;

resilient means for yieldingly urging said operating means towards said second operating position;

holding means for holding said operating means in said first operating position after said operating means has been rocked to said first operating position against said resilient means;

unlocking means including electromagnetic means for releasing said operating means from engagement with said holding means;

a second lobe-like cam element fixed on said cam shaft, said second lobe-like cam element being rotated to rockingly shift said operating means towards said first operating position and then being stopped at a cam position where said operating means is returned to said second operating position;

means to generate tape-end signals;

means for detecting the tape-end signals to energize said electromagnetic means and reverse the direction of the tape travel;

a switch member adapted to be turned on to apply the tape-end signals to said motor switch means, when the operating means is in said second operating position, whereby said movable base plate is moved backwardly away from said cassette loading means; and a cam member mounted on said cam shaft in co-axial relation with said eccentric cam disc, said cam member being adapted to reverse the thrust of said rod upon completion of backward movement of said movable base plate;

whereby the cassette loading means, upon reception of said tape cassette into said cassette loading means, automatically lowers to its loading position in the tape recorder, and loading of said cassette loading means in said recorder is then detected whereby the movable base plate is advanced toward said cassette loading means while the rockable operating means including a magnetic head thereon is rocked to said first operating position where a first tape track is reproduced with the tape being moved to one direction of tape travel, and further said operating means is rocked by the tape-end signal toward the second operating position where another tape track is reproduced with the tape being fed in the reverse direction of tape travel, and finally the cassette loading means is returned, by a tape-end signal, to its raised position for installation of a new tape cassette.

2. The tape recorder as defined in claim 1 including a pair of transversely opposed link mechanisms supporting said cassette loading means on the tape recorder for free movement to and fro on said tape recorder, said link mechanisms each including two arm members which are pivotally interconnected in an X-shaped configuration, said arm members including and being provided at their opposite extremities with laterally-projecting pins, the upper pins of which are respectively inserted into a slot provided in said cassette loading means, whereas the lower of said pins are respectively inserted into a slot provided in said tape recorder.

* * * * *